Oct. 17, 1933.  A. A. WARNER  1,931,450

TOASTER

Filed April 30, 1928   3 Sheets-Sheet 1

Inventor
Alonzo A. Warner
By T. Clay Lindsey
His Attorney

Oct. 17, 1933.   A. A. WARNER   1,931,450
TOASTER
Filed April 30, 1928   3 Sheets-Sheet 2
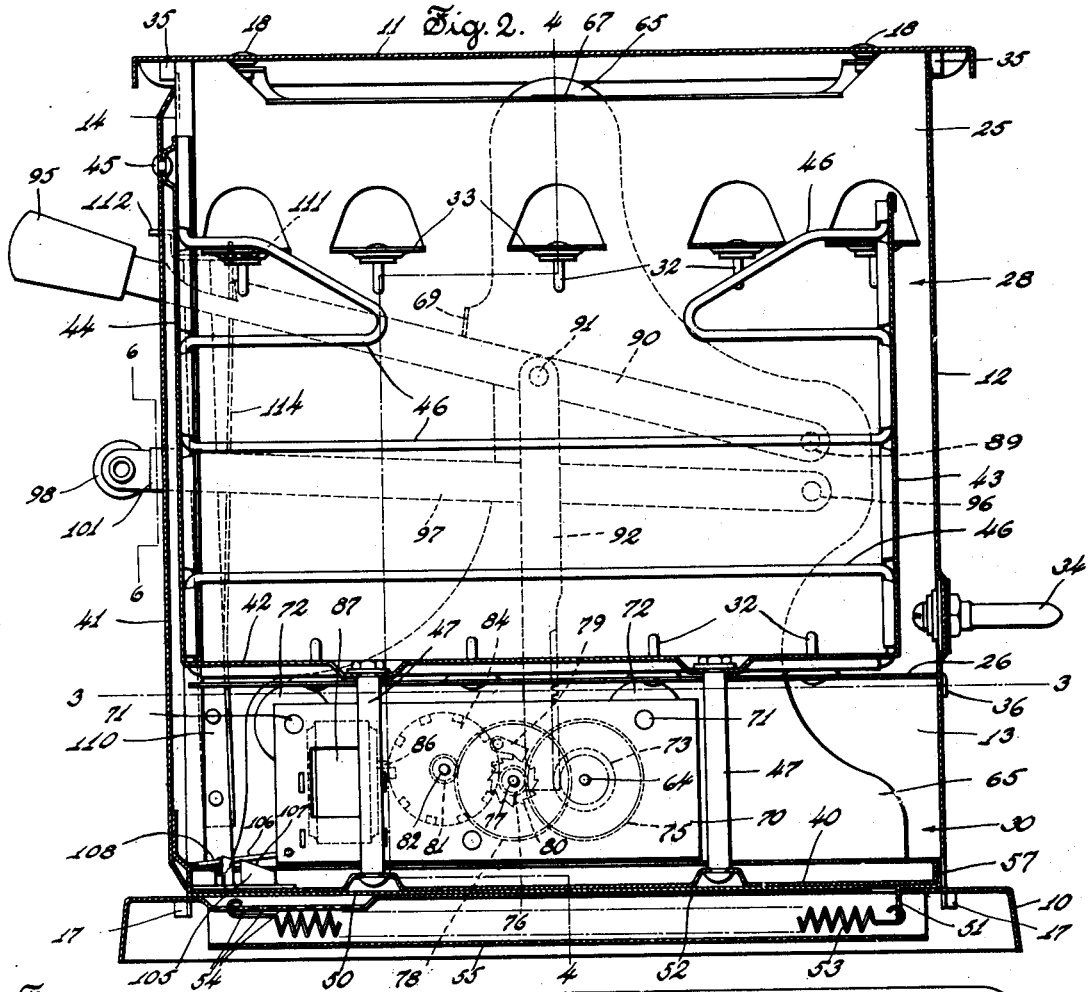
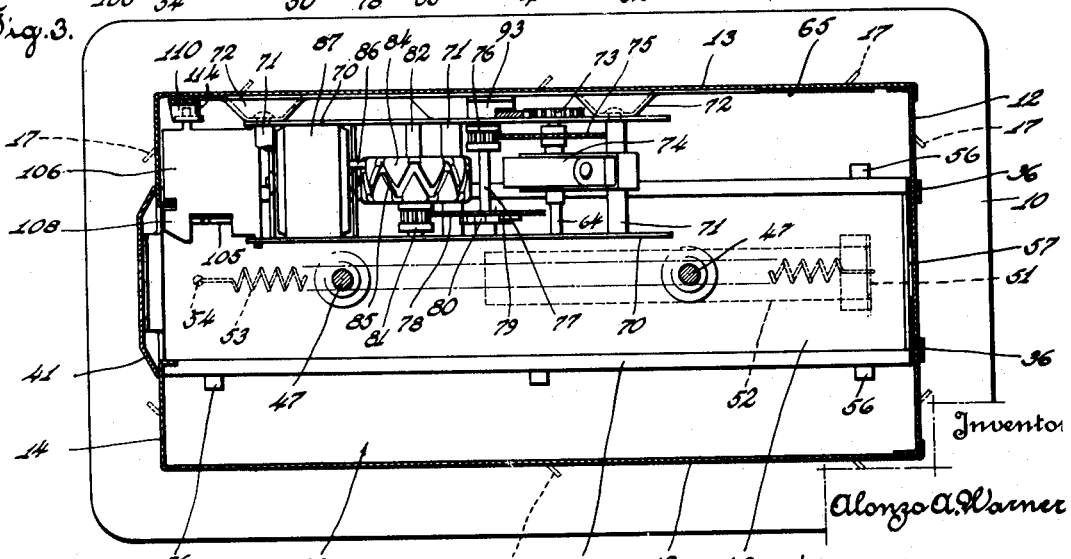
Inventor
Alonzo A. Warner
by N. Ray Lindsey
His Attorney Oct. 17, 1933.  A. A. WARNER  1,931,450
TOASTER
Filed April 30, 1928   3 Sheets-Sheet 3
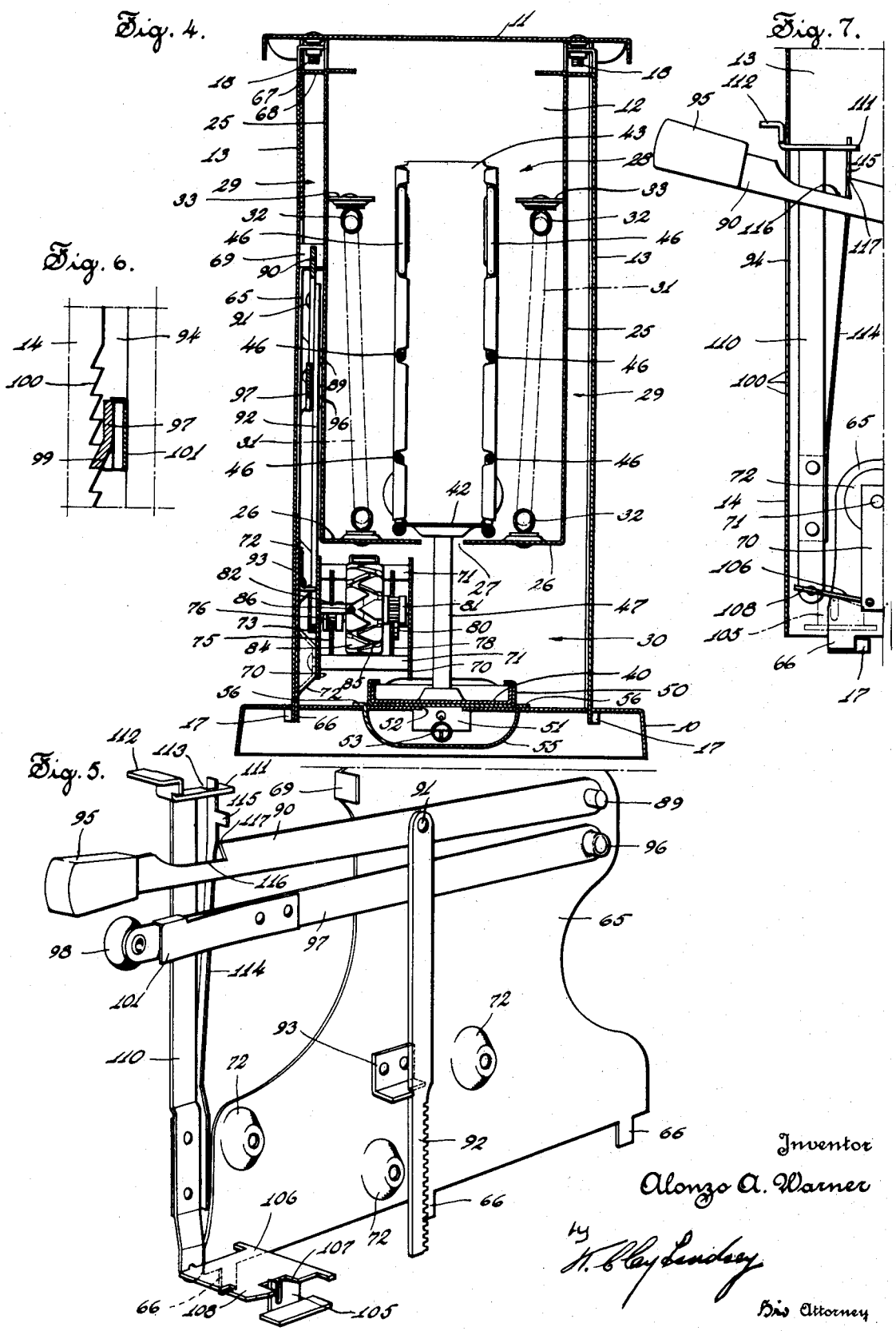
Inventor
Alonzo A. Warner
by H. Clay Lindsey
His Attorney Patented Oct. 17, 1933

1,931,450

UNITED STATES PATENT OFFICE 1,931,450

TOASTER

Alonzo A. Warner, New Britain, Conn., assignor to Landers, Frary & Clark, New Britain, Conn., a corporation of Connecticut Application April 30, 1928. Serial No. 274,017

10 Claims. (Cl. 161—16)

The present invention relates to a toaster of the type having a carrier adapted to move to and from a position between a pair of electrical heating elements or units, and timing mechanism by means of which the carrier may be released at a predetermined time so that, when the toasting operation has been carried to the desired extent, the carrier, together with the toast therein, will move out of the range of the heating elements.

The aim of the invention is to provide a toaster of this sort having various features of novelty and advantage.

More particularly, an aim of the invention is to provide a toaster of this sort which is characterized by its simplicity in construction, its economy in manufacture, the ease and facility with which it may be operated and controlled, and its effectiveness in operation.

A more specific aim of the invention is to provide a toaster of this sort having a relatively few number of parts, each of which may be economically manufactured, the arrangement being such that the parts may be easily assembled, and the device may be quickly and readily repaired in the event such repair is necessary. In accordance with the present invention, the timing mechanism and the elements, through which that mechanism operates the trip for releasing the carrier, are carried, for the most part, by a supporting plate which may be readily assembled on and disassembled from the toaster, thus providing for economy in manufacture and ready repair. The parts are so housed and located that they are protected against injury. A very compact and neat toaster is provided.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one of the many embodiments which the present invention may take:

Fig. 2 is a vertical view taken longitudinally and centrally through the toaster, the carrier being in operative or "in" position;

Fig. 3 is a horizontal sectional view taken substantially on line 3—3 of Fig. 2;

Fig. 4 is a vertical transverse sectional view taken substantially on line 4—4 of Fig. 2;

Fig. 5 is a perspective view of the supporting plate and shows the elements through which the timing mechanism controls the trip for the carrier, the timing mechanism being omitted from this figure;

Fig. 6 is a detail view taken substantially on line 6—6 of Fig. 2; and

Fig. 7 is a detail view showing the latching means about to be disengaged.

Figure 1:
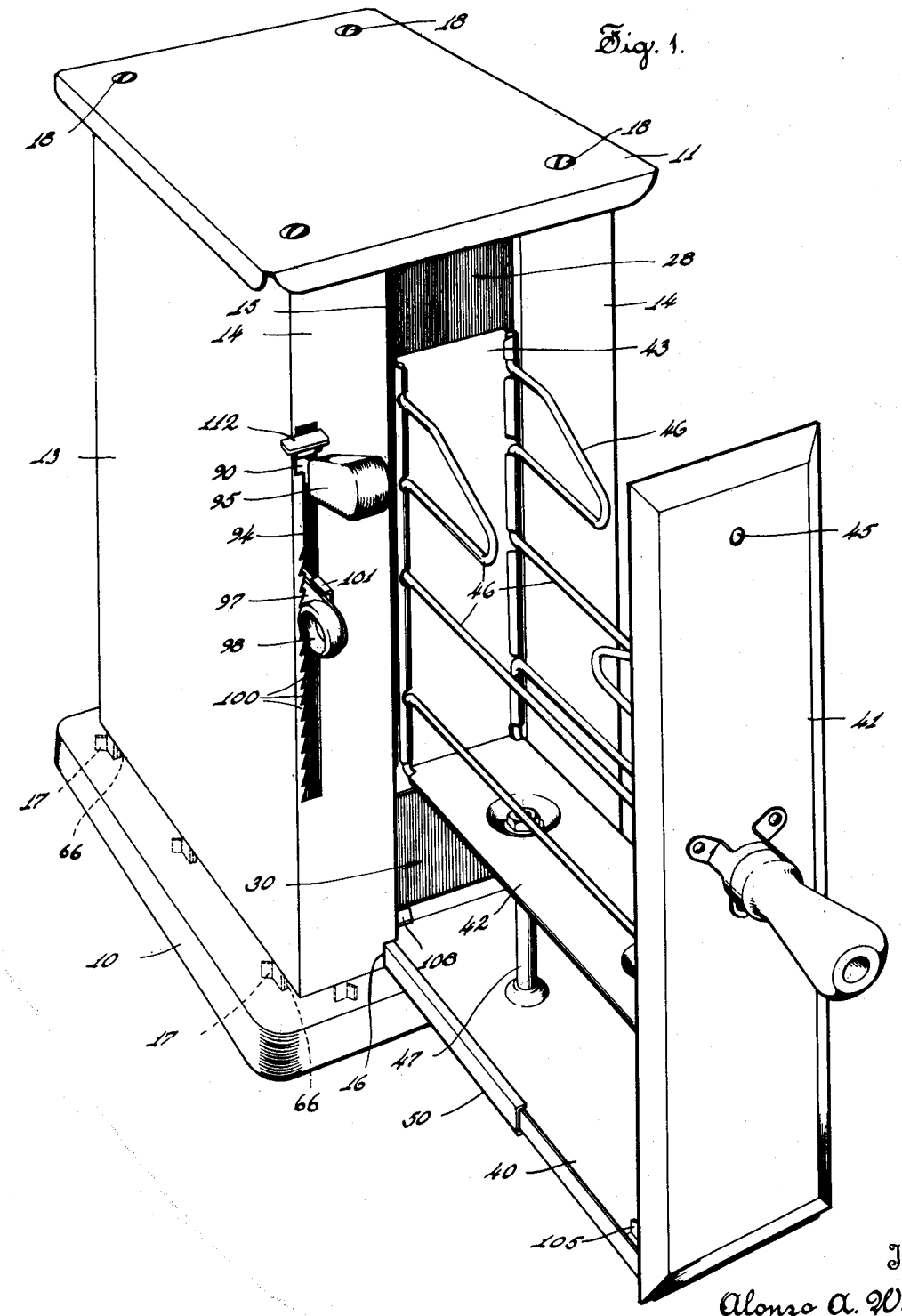
Figure 1 is a perspective view of my improved toaster with the carrier thereof shown in withdrawn or "out" position.

Referring to the drawings in detail, the toaster is shown as having a heat retaining oven or casing provided with a base 10, a top 11, a rear wall 12 and side walls 13, 13. The rear edges of the plates, which form the sides 13, are flanged inwardly so as to overlap the side edges of the rear wall 12. The forward ends of the side plates are turned inwardly to provide a front wall 14 having a vertical opening or doorway provided with notches or lateral extensions 16 at its lower end so as to accommodate the side edges of the extension slide and crum tray hereinafter described more in detail. The sides and rear wall of the housing are secured to the base by means of lugs 17 extending through slots in the base, these lugs being bent after they have been inserted through the slots so as to anchor the parts in place. The top 11 is secured to the side members by bolts or screws 18.

Secured within the housing and spaced from the respective side walls 13 thereof is a pair of partitions 25, the lower ends of which are turned inwardly so as to provide a transverse partition 26 which is longitudinally slotted, as at 27, so as to accommodate the toast carrier. There is thus provided a toasting compartment 28 between the partitions 25, insulating spaces 29 between the partitions and the side walls, and a bottom compartment 30 which houses the timing mechanism and in which is positioned the bread tray of the carrier. Each of the partition plates supports a heating element and, while these elements may be of any suitable type or construction, they are here shown as being in the form of zigzag resistance wires 31 which are held in place by eyelets 32 carried by but insulated from the transverse partition 26, and ears 33 bent inwardly from the partitions 25.

The numeral 34 designates suitable plug terminals which are adapted to be connected to the heating units in any suitable manner, the connections not being shown in the present instance as they form no part of the present invention. The resistance wires are omitted in Fig. 2 so as not to confuse the showing of other parts. Each partition member 25 is secured in place by means of a lug 35 at each upper corner of the plate and a lug 36 at its rear lower corner. These lugs extend through suitable openings in the front and rear walls of the casing and the lugs 36 are bent over as shown.

The toaster is provided with a vertical toast carrier mounted for movement to and from position between the heating elements 31 and through the opening 15 in the front of the casing. In the present illustrative disclosure, this carrier has a sheet metal base 40, the edges of which are turned upwardly so as to form a crumb tray. Secured to the forward end of the tray or base is a vertical closure plate 41 which is adapted to close the doorway or opening 15 when the carrier is in operative position. The carrier is further provided with a toast holder having a bottom 42, a rear wall 43 and a front wall 44, these three portions preferably being formed from a single sheet of metal. The front wall 44 is secured to the closure plate 41 in any suitable manner, as by means of rivets 45. The holder further has suitable sides formed by guard wires 46 between which the toast is adapted to be positioned. The holder is supported in spaced vertical relation with respect to the base or tray 40 by means of posts 47. For the purpose of permitting the toast carrier to be withdrawn entirely from the casing without necessitating detachment of the carrier, there is provided an extension slide 50, the edges of which are turned upwardly and then inwardly so as to form channels for the side edges of the tray.

The slide is guided in its rectilinear movement by the edges of the notches or lateral extensions 16 and by a depending lug 51 engaging in an elongated slot 52 in the base 10.

The carrier is normally urged in a direction to withdraw it from the casing so that, when the carrier is tripped by the timing mechanism hereinafter described more in detail, it will move, together with the toast which has been toasted, out of the range of the heating units. The means for so urging the carrier is shown, for purposes of illustration, as comprising a spring 53 within the base 10 and connected, at one end, to the lug 51. The other end of the spring is adapted to be adjustably connected in any one of the openings 54 in a depending portion of the base in order to regulate the tension of the spring. A sheet metal shield 55 protects the spring. This shield is connected to the base by ears 56. The rear end of the extension slide has an upstanding lug or flange 57 adapted to engage the rear end of the crumb tray.

In accordance with the present invention, the timing mechanism and the means through which said mechanism releases the carrier are mounted on and carried by a supporting plate 65, which is located in one of the spaces 29 and extends down into the chamber 30. In the present illustrative disclosure, this plate 65 abuts against the left hand side wall 13 of the casing and is removably anchored in place at its lower end by lugs 66 extending into the same slots in the base 10 which receive the lugs 17 of the left hand side wall. The plate has, adjacent its upper end, a slot 67 through which extends a lug 68 at the upper end of the side member 13. Between its ends, the plate has a lug 69, the inner end of which is adapted to abut against the partition 25.

The timing mechanism is carried by the lower portion of the supporting plate 65 and is located within the chamber 30 where it is protected against injury and against the heat of the resistance wires. This timing mechanism may be of any suitable sort but it is here shown as having a pair of side plates 70 held in spaced apart relation by cross rods 71, the outer ends of which extend through, and are riveted to, bosses 72 provided on the supporting plate. Journaled in the plates 70 is a shaft 64 having on its outer end a gear 73. Coiled about this shaft and having one end secured thereto is a clock spring 74, the other end of the spring being connected to one of the rods 71. Fixed to the shaft 64 is a sprocket 75 with which meshes a pinion 76 fixed to an arbor 77. Loose in the shaft 77 is a sprocket 78 carrying a pawl 79 cooperating with a ratchet wheel 80 fixed to the arbor 77. Meshing with the sprocket 78 is a pinion 81 fixed to a shaft 82 which carries an escapement member 84. This member has a zigzag channel or slot 85 in which engages a pin 86 carried by a balance wheel 87 which is journalled on an axis at right angles to the axis of the escapement member 84. When the gear 73 is rotated in the counter-clockwise direction, the spring 74 is wound up and the pawl 79 rides over the ratchet wheel 80. The spring 74 normally tends to rotate the gear 73 clockwise, and while so doing, the pin 86 works back and forth in the channel 85 so that the spring can turn the gear 73 only at a slow rate of speed.

Pivoted on a stud 89 on the supporting plate 65 is an operating and trip lever 90 to which is pivotally connected, by a pin 91, a depending rack bar 92 which meshes with the gear 73. This rack bar is held in meshing relation to this gear by means of a guide member or L-shaped bracket 93 fixed to the supporting plate 65. The forward end of the lever 90 extends through a vertical slot 94 in the front wall 14 of the casing or oven and carries a handle or knob 95.

Pivoted on a stud 96 on the supporting plate 65 is a setting arm or bar 97 which also extends through the slot 94 and carries a button or finger piece 98. The free end of this arm 97 is provided with an offset portion 99 which forms a tooth adapted to selectively cooperate with the teeth 100 formed by serrating one edge of the slot 94. The free end of the arm 97 is normally urged, by means of a spring 101, in a direction to engage the tooth 99 within the serrations 100.

Secured to the bread tray immediately behind the closure plate is a catch 105 with which the latch 106 is adapted to cooperate for holding the carrier within the casing during the toasting operation. The catch 105 has a vertical forward edge and a downwardly and rearwardly inclined upper edge 107. The latch plate 106 is pivoted between the forward ends of the side plates 70 of the timing mechanism and has a projection 108 adapted to engage the forward vertical edge of the catch 105 when the parts are in locking position. The numeral 110 designates a trip rod pivotally connected at its lower end to the latch plate 106, as shown most clearly in Fig. 5. The trip rod 110 has, at its upper end, a projection or tail 111 provided with a notch 113. The rod also has a thumb piece 112 extending through and projecting forwardly of the upper end of the slot 94 in the front of the casing.

For the purpose of permitting the latch plate 106 to lock the carrier within the casing (although the trip lever 90 is in its full uppermost position as shown in Fig. 2) there is provided on the trip rod 110 a spring 114 with which the lever 90 cooperates, as hereinafter described more in detail. This spring, which is in the form of a resilient strip or leaf, is fixed at its lower end to the rod 110 and at its upper end engages in the notch 113. Adjacent its upper end, the spring 114 has a lateral projection 115 extending over and into the path of movement of the lever 90.

The latter has a notch or recess 116 adapted to receive the projection 115 after the latch has been tripped. Just rearwardly of the notch 116 is a ledge or shoulder 117 adapted to engage the lower edge of the projection 115 so as to raise the rod 110 and the latch plate to trip the carrier as shown in Fig. 7.

The operation of my improved toaster is briefly as follows: The piece of bread to be toasted is positioned in the toast holder and then the carrier is moved from the position shown in Fig. 1 to that shown in Fig. 2 so that the toast is between the heating units 31. The latch plate 106 is normally in the latching position shown in Figs. 2 and 5, so that when the carrier is moved in, the latch will ride up the inclined edge 107 and then drop down so that the projection 108 is in front of the catch 105. The trip lever 90 may now be moved down until it engages the setting arm 97 which has been previously adjusted. When the lever 90 is moved down, the spring 74 of the timing mechanism is wound up, the gear 73 being rotated in a counterclockwise direction, as previously explained. Upon release of the trip lever, the timing mechanism, through the rack bar 92, will slowly move the trip lever upwardly, and when this lever approaches the limit of its upward travel, the ledge 117 engages the projection 115 (see Fig. 7) so that the trip rod and latch plate are moved upwardly, thus releasing the toast carrier which, under the influence of the spring 53, will be moved to the inoperative position shown in Fig. 1. More particularly, the extension slide is moved outwardly with a relatively quick movement, and the toast carrier, due to its momentum, will coast or slide on the extension slide to the position shown in Fig. 1.

After the locking means has thus been tripped, the lever 90 continues to move upwardly a slight extent so that the ledge 117 rides from under the projection 115 (see Fig. 2) with the result that the trip rod and latch plate will drop under gravity to normal position. The extent to which the timing mechanism can move the lever 90 upwardly is limited by the lug or projection 69, as will be seen most clearly from Fig. 2. The setting arm 97 will be adjusted, of course, in accordance with the desired extent to which the pieces of bread are to be toasted. If well-toasted bread is desired, the setting lever will be adjusted so that the tooth 99 thereon will engage one of the lower teeth 100.

As previously stated, the upper edge of the catch 105 is inclined or beveled downwardly and rearwardly, the purpose of this being to permit the latch plate to be cammed upwardly when the carrier is moved inwardly. The latch plate is in latching position when the lever is in full raised position so that when it is desired to put the toaster away after using, the carrier may be locked and held within the casing by merely moving the carrier into the casing.

From the foregoing description, taken in connection with the accompanying drawings, it will be seen that my improved toaster is very simple and effective in construction and operation. When the toaster is tripped, the toast is entirely withdrawn from the range of the heating elements so that the person using the toaster may, after setting it in operation, leave it without danger of burning the toast. The current is maintained on the heating elements until it is deliberately and manually broken by disconnecting a plug from the terminals 34 so that a number of pieces may be toasted in succession while maintaining a uniform heat within the oven and without the necessity of waiting for the oven to be brought up to the desired heat each time a piece of bread is inserted thereinto.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language might be said to fall therebetween.

I claim as my invention:

1. An electric toaster having a casing provided with a hollow base and an opening in its front wall having lateral notches in its lower end, a pair of spaced apart vertical heating elements in said casing, a carrier having a base in the form of a crumb tray and a toast holder adapted to move to and from position between said elements, an extension slide mounted on said base and having channel-shaped side edges engaging in said notches, the sides of said crumb tray being slidably mounted in said channels, said base having a longitudinally extending slot and said slide having a depending lug engaging in said slot, and a spring connected at its forward end to said base and at its rear end to said lug.

2. An electric toaster having a casing provided with an opening in its front wall, a heating chamber, a lower chamber therebeneath and a partition between said chambers having a longitudinally extending slot; a pair of spaced apart vertical heating elements in said heating chamber; a toast carrier mounted for sliding movement through said opening and having a crumb tray slidably mounted in the bottom of said lower chamber, said carrier also having a toast holder mounted for movement to and from said heating chamber, and posts between said crumb tray and holder and extending through said slot; means for normally urging said carrier outwardly of the casing, means for locking carrier in toasting position, timing mechanism within said lower chamber, and connections through which said timing mechanism controls said locking means.

3. An electric toaster having a casing provided with an opening in its front wall, a pair of spaced apart heating elements in said casing, a toast carrier mounted for sliding movement through said opening to and from the space between said elements, means normally urging said carrier outwardly, means for latching said carrier in toasting position, a detachable supporting plate in said casing, timing mechanism carried by said plate, and a connection through which said timing mechanism controls said latching means, said connection including a lever pivoted to said plate and adapted to be moved in one direction to wind up the timing mechanism and to be moved in the opposite direction by said timing mechanism to trip said latching means, and a member carried by said plate for determining the extent of movement of said lever.

4. An electric toaster having a casing provided with a pair of side walls and an opening in its front wall, a pair of spaced heating elements in said casing, a toast carrier mounted for movement through said opening to and from the space between said elements, means for normally urging said carrier outwardly, a detachable supporting plate abutting against one of said side walls, latching means carried in part by said carrier and in part by said supporting plate, timing mechanism carried by said supporting plate, a trip rod connected to said latching means, an operating lever pivoted to said plate, a rack bar pivoted to said lever and cooperating with said timing mechanism whereby said timing mechanism is wound up when the lever is depressed and said lever is raised by said timing mechanism to engage said trip rod, and a setting lever pivoted to said plate.

5. An electric toaster having a casing provided with an opening in its front wall, a heating chamber, an insulating space between the heating chamber and each side wall of the casing, and a lower chamber beneath the heating chamber; a pair of heating elements within the heating chamber; a vertical toast carrier mounted for sliding movement through said opening and having a base located in said lower chamber, and a toast holder movable to and from the space between said heating elements; means for normally urging said toast carrier outwardly of the casing, a supporting plate abutting one of the side walls of said casing and having its upper end located in one of said insulating spaces and its lower end in said lower compartment, latching means for locking said carrier in toasting position, timing mechanism carried by said plate and located in said lower chamber, a lever pivoted to said plate and extending forwardly through the front wall of the casing, a connection between said lever and timing mechanism, and a connection between said lever and latching means.

6. An electric toaster having a casing provided with an opening in its front wall, a pair of spaced apart heating elements in said casing, a toast carrier mounted for sliding movement through said opening and to and from the space between said elements, means for normally urging said carrier outwardly of the casing, latching mechanism for locking said carrier in toasting position, timing mechanism, and a connection between said timing mechanism and latching mechanism and including an operating lever, said connection being arranged to permit engagement of said latching mechanism when said lever has been moved to its full extent by said timing mechanism.

7. An electric toaster having a casing provided with an opening in its front wall, a pair of spaced apart heating elements in said casing, a toast carrier mounted for sliding movement through said opening and to and from the space between said elements, means for normally urging said carrier outwardly of the casing, latching mechanism for locking said carrier in toasting position and including a catch on said carrier and a cooperating latch plate, timing mechanism, an operating lever actuated by said mechanism, a connecting member between said lever and latch plate through which said latch plate is moved out of latching position when said lever approaches the limit of its movement under the influence of said timing mechanism, said connecting member being automatically disengaged from said lever after said latch plate is tripped.

8. An electric toaster having a casing provided with an opening in its front wall, a pair of spaced heating elements in said casing, a toast carrier mounted for sliding movement through said opening and to and from the space between said elements, means for normally urging said carrier outwardly of the casing, a pivoted latch plate, a catch on said carrier adapted to cam said latch plate upwardly when the carrier is moved into operative position, timing mechanism, an operating lever actuated by said timing mechanism, a trip rod connected to said latch plate, and a spring on said rod, said spring and lever having shoulders adapted to engage when said lever approaches its uppermost position and to ride out of engagement thereafter, whereby said latch plate is disengaged and then drops to latching position.

9. An electric toaster having a casing provided with an opening in its front wall, a pair of spaced apart heating elements in said casing, a toast carrier mounted for sliding movement through said opening to and from the space between said elements, means normally urging said carrier outwardly, a latch for locking said carrier in toasting position, a trip rod member connected to said latch, timing mechanism, an operating lever member actuated by said mechanism, one of said members having a shoulder, and a connecting member carried by and movable relative to the other of said members and having a part adapted to engage said shoulder when said lever approaches its uppermost position, said part being normally urged to operative position with respect to said shoulder, and said part and shoulder riding out of engagement after the latch is tripped whereby said latch may move to latching position.

10. In an electric toaster having a casing provided with an opening in its front wall, a heating chamber, an insulating space between the heating chamber and each side wall of the casing, and a lower chamber beneath said heating chamber; a pair of heating elements within the heating chamber; a vertical toast carrier mounted for sliding movement through said opening and having a base located in the lower chamber, and a toast holder movable to and from the space between said heating elements; means for normally urging said toast carrier outwardly of the casing, a supporting plate adjacent one of the side walls of said casing and having its upper end located in one of said insulating spaces and its lower end in said lower chamber, latching means for locking said carrier in toasting position, a timing mechanism carried by said plate and located in said lower chamber, and operative connections between said timing mechanism and latching means and carried by said plate and located in part within one of said insulating spaces.

ALONZO A. WARNER.